June 24, 1941.  K. BRENKERT  2,246,972
FRAMING MECHANISM AND SHUTTER COMPENSATOR
Filed Jan. 29, 1940  3 Sheets-Sheet 1
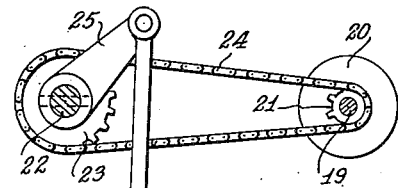
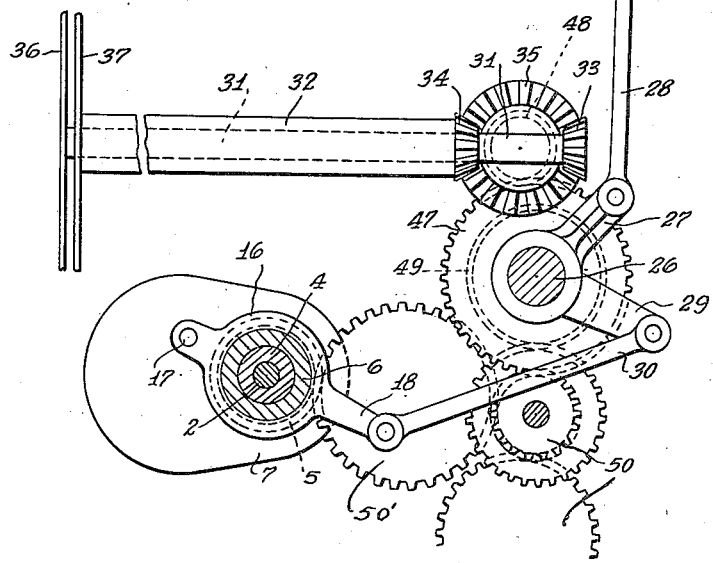
Fig. 1.
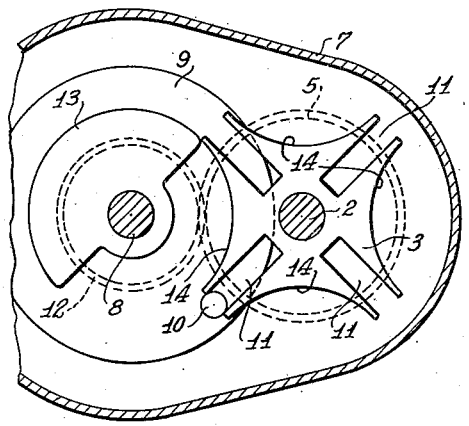
Fig. 2.
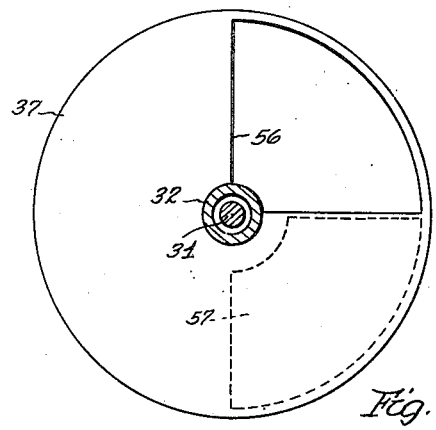
Fig. 3.
INVENTOR.
Karl Brenkert
BY Samuel Weisman
ATTORNEY.

June 24, 1941. K. BRENKERT 2,246,972
FRAMING MECHANISM AND SHUTTER COMPENSATOR
Filed Jan. 29, 1940 3 Sheets-Sheet 2
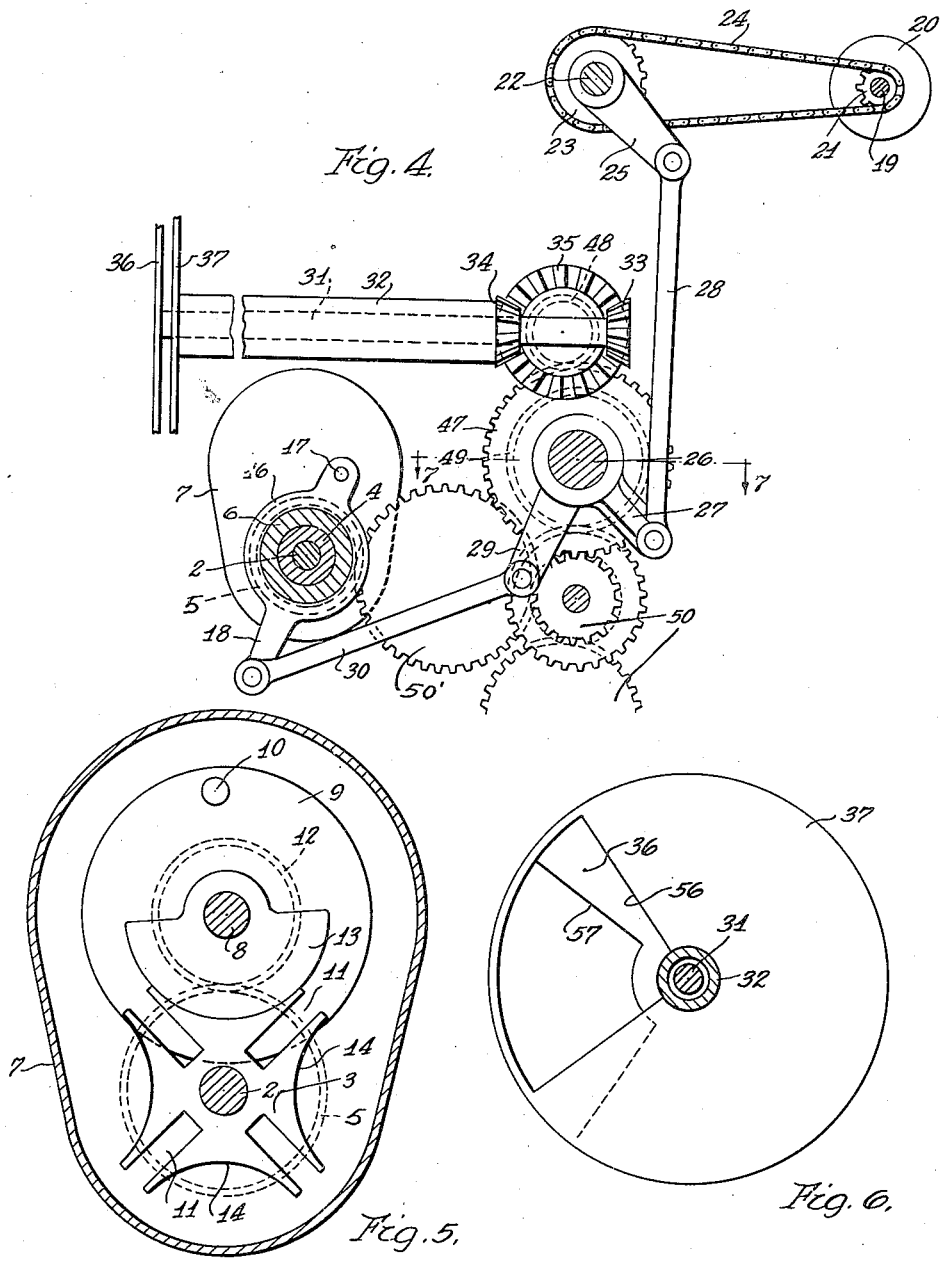
INVENTOR.
Karl Brenkert
BY Samuel Weisman
ATTORNEY.

June 24, 1941.        K. BRENKERT        2,246,972
FRAMING MECHANISM AND SHUTTER COMPENSATOR
Filed Jan. 29, 1940          3 Sheets-Sheet 3

INVENTOR.
Karl Brenkert
BY Samuel Wiseman
ATTORNEY.

Patented June 24, 1941

2,246,972

UNITED STATES PATENT OFFICE 2,246,972

FRAMING MECHANISM AND SHUTTER COMPENSATOR

Karl Brenkert, Detroit, Mich., assignor to Brenkert Light Projection Company, Detroit, Mich., a corporation of Michigan Application January 29, 1940, Serial No. 316,176

12 Claims. (Cl. 88—13)

The present invention pertains to a novel framing mechanism for motion picture machines.

In motion picture machines, particularly projectors, the pictures or exposures on the film are brought by an intermittent movement successively into register with the projection aperture. The pictures frequently slip or are thrown out of register with the aperture, through various causes well known in the art. The operation of restoring the pictures into register is known as framing.

Framing is commonly performed by shifting either the cam or the star wheel of the intermittent Geneva movement relatively to the other. This is equivalent to advancing or retarding the film relatively to the projection aperture, whereby the film is adjusted so that it registers with the projection aperture during the dwell of the intermittent movement. As a result of this adjustment, the maximum opening of the shutter would normally occur at an instant not coinciding with the dwell, and the shutter must therefore be adjusted or compensated to restore its proper synchronism with the intermittent movement.

The principal object of this invention is to provide an improved framing mechanism which adjusts the shutter to maintain the timed relation between the movement of the shutter shaft and the sprocket shaft as well as the intermittent mechanism in the manner described above. More specifically, the invention provides a mechanism that is compact, durable and reliable in operation.

In prior devices of this general character, the intermittently moving star wheel is adjusted around the axis of the cam, carrying with it the film feeding sprocket. This causes an alteration in the feeding path of the film, which must be compensated by some means provided for the purpose. Another object of this invention is to make the adjustment by moving the cam around the axis of the star wheel and sprocket, so that this axis and the path of film are not altered.

It has been the practice heretofore to gear the shutter for driving purposes to the constantly rotating member of the intermittent mechanism. It has been found that the impulses of the intermittently moving driven member of star wheel have a detrimental effect on the delicately adjusted, constantly moving shutter. Another object of the invention is to avoid transmitting these impulses to the shutter and is accomplished by a novel gear arrangement.

The invention is fully disclosed by way of example in the following description and in the accompanying drawings in which:

Figure 1 is an elevation of the framing mechanism, showing some of the parts in section;

Figure 2 is a sectional view of the intermittent mechanism in the position corresponding to Figure 1;

Figure 3 is a diagrammatic view of the shutter blades corresponding to the position of parts in Figures 1 and 2;

Figure 4 is a view similar to Figure 1, illustrating an adjustment of the mechanism;

Figure 5 is a section similar to Figure 2 and corresponding to the position shown in Figure 4, assuming that the driving mechanism has remained stationary during the adjustment;

Figure 6 is a diagrammatic view of the shutter blades corresponding to the position of parts in Figures 4 and 5 under like conditions;

Reference to these views will now be made by use of like characters which are employed to designate corresponding parts throughout.

Figure 7:
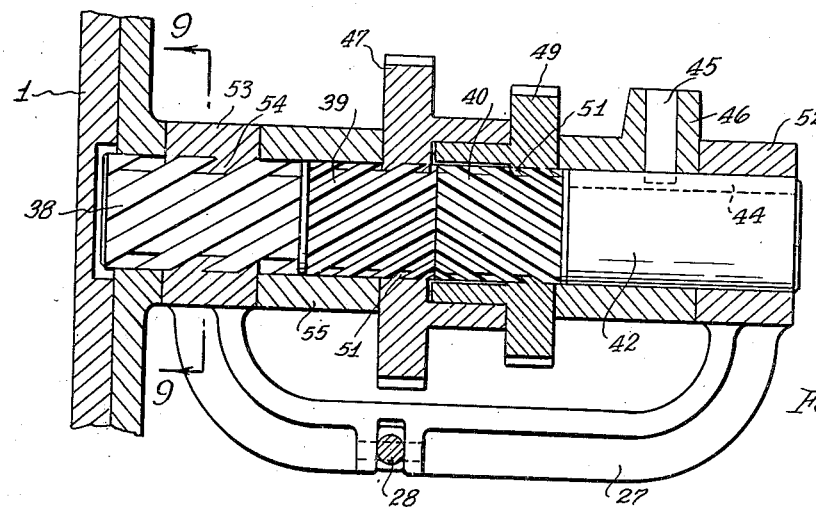
Figure 7 is a section on the line 7—7 of Figure 4.
Figure 8:
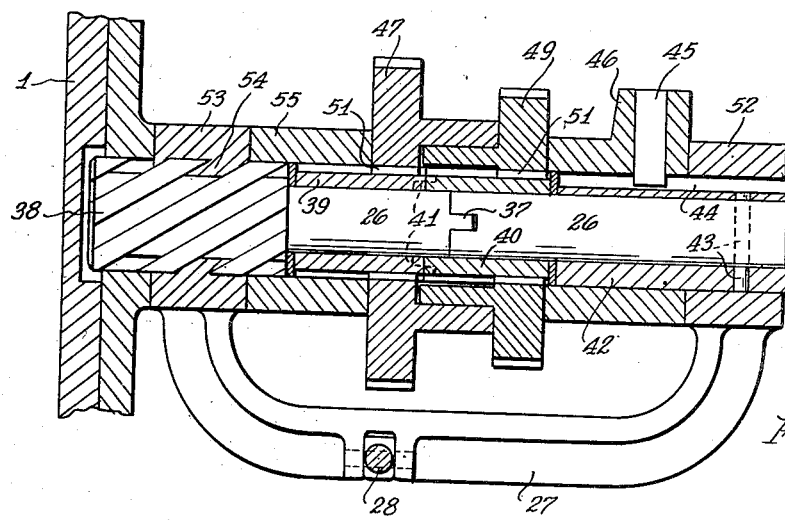
Figure 8 is a similar section, with certain parts shown in elevation.
Figure 9:
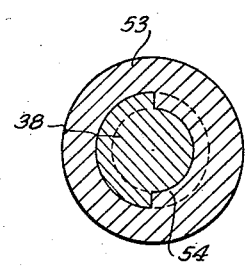
Figure 9 is a section on the line 9—9 of Figure 7.

In Figures 7 and 8 is illustrated a fixed frame structure in which are journaled several shafts perpendicular thereto and mentioned below. The member 1 may conveniently be the partition separating the film compartment from the mechanism compartment in the projector, and the remaining ends of the shafts may be journaled in the opposite wall of the mechanism compartment in a manner well known in the art and requiring no specific illustration here.

One of these shafts is indicated by the numeral 2 and carries the star wheel 3 of the intermittent Geneva movement as well as the film feeding sprocket. Both members are fixed to the shaft to move together. On the shaft 2 is rotatably mounted a drive sleeve 4 carrying a gear 5 driven from the usual motor by appropriate gearing. Being free on the shaft, the sleeve does not immediately affect the movement of the star wheel and sprocket. The sleeve in turn is loosely surrounded by a boss 6 which is an integral part of a housing 7 enclosing the entire intermittent mechanism.

In the housing 7 is journaled another shaft 8 carrying a so-called cam consisting of a disk 9 and a pin 10 adapted to enter the slots 11 of the star wheel 3 after the fashion of the well known Geneva movement. The shaft 8 also carries a gear 12 meshing with the gear 5, whereby the cam is also driven continuously by the motor.

The shaft 8 also carries a lock consisting of an arcuate member 13 shaped and positioned to engage the arcuate edges 14 of the star wheel when the pin 10 is out of the slot 11, so that the star wheel remains stationary at such times.

The boss 6 is surrounded by a collar 16 fixed at one point 17 to the housing 7. An arm 18 extends from the collar, and when the arm is moved the housing 7 is swung in the same direction about the stationary axis of the shaft 2, carrying with it the shaft 8 and the cam 9, 10. The means for thus moving the arm 18 will now be described, and it will be understood in this connection that the adjustment of the cam relatively to the star wheel is equivalent to pulling the film in one direction or the other and is carried out to the extent necessary to bring the pictures into registration with the projection aperture during the dwell in the intermittent movement.

In a suitable part of the housing is journaled a framing shaft 19 preferably parallel to the sprocket shaft 2. The shaft 19 carries a knob or handle 20 and a sprocket wheel 21. Adjacent to the shaft 19 is a similarly journaled shaft 22 carrying a preferably larger sprocket wheel 23 joined to the wheel 21 by a sprocket chain 24. A lever 25 is fixed to the shaft 22 to turn therewith through the operation of shaft 19. Below the shaft 22 is another shaft 26 also journaled in the member 1 and about the axis of which is journaled a yoke 27. The latter is joined to the arm 25 by a link 28. An arm 29 extends rigidly from the yoke and is joined to the arm 18 by a link 30. By this means the cam 9, 10 is adjusted relatively to the star wheel from the knob 20, and a suitable device (not shown) may be provided for locking the knob in its adjusted position.

Adjacent to the axis of the shaft 26 are mounted inner and outer shutter shafts 31 and 32, the inner shaft extending beyond the outer shaft and the ends of the shafts carrying opposed bevel gears 33 and 34. Between these gears is a crown gear 35 meshing therewith and which, when driven, turns the shafts 31 and 32 in opposite directions in the manner shown and described in my copending Patent No. 2,211,364 of August 13, 1940. The remaining ends of the shafts carry shutter blades 36 and 37 shown in Figure 4 and illustrated diagrammatically in Figures 3 and 6.

The shaft 26 is preferably formed in two sections keyed together at 37 for assembly purpose, as shown in Figure 8. One end of the shaft is enlarged in diameter and formed as a multiple spline member 38 having a pitch angle of about 49°.

Adjacent to the member 38, two more such members 39 and 40 are mounted on the shaft 26 in end to end relation to each other. These members are grooved spirally or splined oppositely to each other and are keyed together at their meeting ends as indicated by the numeral 41 in Figure 8. Next to the member 40, a sleeve 42 is mounted on the shaft 26 and secured thereto by a pin 43. The sleeve is slotted lengthwise at 44 to receive a pin 45 extending from a fixed frame member 46. The shaft 26 is thereby held against rotation, but the spline members 39 and 40 are rotatable thereon.

On the member 39 is mounted a gear 47 meshing with another gear 48 co-axial with and fixed to the crown gear 35, as also disclosed in the above mentioned copending application. Similarly a gear 49 is mounted on the member 40 and is in mesh with the divided gear train which is generally represented by the numeral 50 and which is branched at 50' to connect with the intermittent gearing 5, 12. The gears 47 and 49 are splined internally at 51 to mesh respectively with the spline members 39 and 40.

The yoke 27 terminates in two spaced bosses around the axis of the shaft 26. One of these bosses 52 is adapted to turn freely on the end of the shaft 26 near the pin 43. The other boss 53 is splined internally at 54 to mesh with the member 38 as described in connection with the members 39, 40, 47, 49. A spacer 55 in the form of a fixed frame member is preferably provided around the axis of shaft 26 between the members 53 and 47.

When the yoke 27 is turned in the manner described above, the internal spline 54 thereof meshing with the spline member 38 causes a sliding movement of this member, the shaft 26 and the members 39, 40, since the slot and pin 45 prevent rotation and permit only longitudinal movement. The sliding of the spline 39 and 40 cause relative rotation of the gears 47 and 49 or, in other words, a change in the static gear relation between the shutter gearing and the gearing of the intermittent mechanism. The parts are so dimensioned that the adjustment of the shutter accurately compensates the loss of synchronism introduced by the framing adjustment of the intermittent mechanism, as above set forth.

Figures 3 and 6 illustrate two relative positions of the shutter blades corresponding to the framing adjustments illustrated respectively in Figures 1 and 4, in an assumed static or motionless condition of the driving mechanism. It will be seen that the shutter openings 56 and 57 have been moved from a non-overlapping and fully obstructed position in Figure 3 nearly to the full open position in Figure 6, while the internal spline member 54 has been rotated about 90°. The comparatively large movement of the shutter blades is due to the large pitch angle of the several spline members as well as the opposed members 39 and 40 which double the action on the relative displacement of gears 47 and 49, as distinguished from ordinary spiral gears which have a maximum pitch angle of about 14°.

In addition to its compact and rugged construction, the mechanism herein described has the advantage of isolating the intermittent mechanism from the shutter drive. The driving gear train to the shutter does not directly include the intermittent mechanism, with the result that the vibration of the latter is not transmitted to the shutter, as would be the case if the intermittent mechanism were comprised in the driving gear train.

The intermittent mechanism is isolated from the shutter driving gear in the framing operation as well as in normal running. In this connection it will be seen that the adjusting mechanism or framing mechanism operates initially or directly on the shutter driving gearing without first requiring adjustment of the intermittent mechanism. The latter is merely linked to the adjusting mechanism and is dependent for its adjustment on the adjustment of the shutter. As a result of this arrangement, the framing operation is easier and the adjustment is more stable than in a reversed construction wherein the adjustment of the intermittent mechanism determines the adjustment of the shutter and wherein the vibration of the intermittent mechanism is transmitted throughout the framing mechanism.

Although a specific embodiment of the invention has been illustrated and described, it will be understood that various alterations in the details of construction may be made without departing from the scope of the invention as indicated by the appended claims.

What I claim is:

1. In a motion picture machine, a film feeding mechanism including a constantly rotating drive member and an intermittently rotating member driven thereby, one of said members being mounted for adjustment around the other; a frame structure, a shutter driving member rotatably and slidably supported thereby, a shutter driving gear spirally splined to said shutter driving member and held against sliding movement, means exclusive of said adjustable member for sliding said shutter driving member relatively to said shutter driving gear, means for rotating said shutter driving member, and a connection between said sliding means and said adjustable member for adjusting the latter on actuation of said sliding means.

2. In a motion picture machine, a film feeding mechanism including a constantly rotating drive member and an intermittently rotating member driven thereby, one of said members being mounted for adjustment around the other; a frame structure, a shutter driving member rotatably and slidably supported thereby, a shutter driving gear surrounding said shutter driving member and spirally splined thereto, means for sliding said shutter driving member relatively to said shutter driving gear, means for rotating said shutter driving member, and a connection between said sliding means and said adjustable member, whereby both are actuated simultaneously.

3. In a motion picture machine, a film feeding mechanism including a constantly rotating drive member and an intermittently rotating member driven thereby, one of said members being mounted for adjustment around the other; a frame structure, a shutter driving member rotatably and slidably supported thereby, a shutter driving gear spirally splined to said shutter driving member and held against sliding movement, a drive gear spirally splined on said shutter driving member oppositely to said driving gear, both gears being held against sliding movement, means for sliding said shutter driving member relatively to said shutter driving gear, means for rotating said driving member, and a connection between said sliding means and said adjustable member, whereby both are actuated simultaneously.

4. In a motion picture machine, a film feeding mechanism including a constantly rotating drive member and an intermittently rotating member driven thereby, one of said members being mounted for adjustment around the other; a frame structure, a shaft slidably mounted therein and held against rotation, a shutter driving member freely rotatable on said shaft and slidable therewith, means for rotating said shutter driving member, a shutter driving gear spirally splined on said shutter driving member and held against sliding movement, to be adjusted angularly on sliding said shaft and shutter driving member, means for sliding said shaft, and a connection between said sliding means and said adjustable member, whereby both are actuated simultaneously.

5. In a motion picture machine, a film feeding mechanism including a constantly rotating drive member and an intermittently rotating member driven thereby, one of said members being mounted for adjustment around the other; a frame structure, a shaft slidably mounted therein and held against rotation, a shutter driving member freely rotatable on said shaft and slidable therewith, a shutter driving gear spirally splined on said shutter driving member and held against sliding movement, to be adjusted angularly on sliding said shaft and shutter driving member, means for sliding said shaft, a drive gear spirally splined on said shutter driving member oppositely to said driving gear and held against sliding movement, and a connection between said sliding means and said adjustable member, whereby both are actuated simultaneously.

6. In a motion picture machine, a film feeding mechanism including a constantly rotating drive member and an intermittently rotating member driven thereby, one of said members being mounted for adjustment around the other; a frame structure, a multiple spirally splined shutter driving member rotatably and slidably supported thereby, a shutter driving gear surrounding and meshing with said shutter driving member, means for sliding said shutter driving member relatively to said shutter driving gear, means for rotating said shutter driving member, and a connection between said sliding means and said adjustable member for adjusting the latter on actuation of said sliding means.

7. In a motion picture machine, a film feeding mechanism including a constantly rotating drive member and an intermittently rotating member driven thereby, one of said members being mounted for adjustment around the other; a frame structure, a shutter driving member rotatably and slidably supported thereby, said member having two portions multi-splined spirally and oppositely to each other, a shutter driving gear surrounding and meshing with one portion, a drive gear surrounding and meshing with the other portion, both gears being held against sliding movement, means for sliding said shutter driving member relatively to said shutter driving gear, means for rotating said driving member, and a connection between said sliding means and said adjustable member, whereby both are actuated simultaneously.

8. In a motion picture machine, a film feeding mechanism including a constantly rotating drive member and an intermittently rotating member driven thereby, one of said members being mounted for adjustment around the other; a frame structure, a shaft slidably mounted therein and held against rotation, a shutter driving member freely rotatable on said shaft and slidable therewith, means for rotating said shutter driving member, a shutter driving gear spirally splined on said shutter driving member and held against sliding movement, to be adjusted angularly on sliding said shaft and shutter driving member, an adjusting member rotatably mounted about said shaft and having a spiral spline connection thereto, whereby to slide said shaft, and a connection between said adjusting member and said adjustable member, whereby both are actuated simultaneously.

9. In a motion picture machine, a film feeding mechanism including a constantly rotating drive member and an intermittently rotating member driven thereby, one of said members being mounted for adjustment around the other; a frame structure, a shaft slidably mounted therein and held against rotation, a multi-spirally splined shutter driving member freely rotatable on said shaft and slidable therewith, means for sliding said shutter driving member relatively to said shutter driving gear, means for rotating said shutter driving member, and a connection between said sliding means and said adjustable member, whereby both are actuated simultaneously.

10. In a motion picture machine, a film feeding mechanism including a constantly rotating drive member and an intermittently rotating member driven thereby, one of said members being mounted for adjustment around the other; a frame structure, a shaft slidably mounted therein and held against rotation, a shutter driving member freely rotatable on said shaft and slidable therewith, said member having two portions multi-splined spirally and oppositely to each other, a shutter driving gear surrounding and meshing with one portion, a drive gear surrounding and meshing with the other portion, both gears being held against sliding movement, means for sliding said shutter driving member relatively to said shutter driving gear, means for rotating said shutter driving member, and a connection between said sliding means and said adjustable member, whereby both are actuated simultaneously.

11. In a motion picture machine, a film feeding mechanism including a constantly rotating drive member and an intermittently rotating member driven thereby, one of said members being mounted for adjustment around the other; a frame structure, a shaft slidably mounted therein and held against rotation, a multi-spirally splined shutter driving member freely rotatable on said shaft and slidable therewith, an adjusting member rotatably mounted about said shaft and having a spiral spline connection thereto, whereby to slide said shaft, and a connection between said adjusting member and said adjustable member, whereby both are actuated simultaneously.

12. In a motion picture machine, a film feeding mechanism including a constantly rotating drive member and an intermittently rotating member driven thereby, one of said members being mounted for adjustment around the other; a frame structure, a shaft slidably mounted therein and held against rotation, a shutter driving member freely rotatable on said shaft and slidable therewith, said member having two portions multi-splined spirally and oppositely to each other, a shutter driving gear surrounding and meshing with one portion, a drive gear surrounding and meshing with the other portion, both gears being held against sliding movement, an adjusting member rotatably mounted about said shaft and having a spiral spline connection thereto, whereby to slide said shaft, and a connection between said adjusting member and said adjustable member, whereby both are actuated simultaneously.

KARL BRENKERT.